United States Patent
Roy et al.

(10) Patent No.: US 10,190,687 B2
(45) Date of Patent: *Jan. 29, 2019

(54) METHODS OF FORMING SUPERELASTIC SEALS

(71) Applicant: Baker Hughes Incorporated, Houston, TX (US)

(72) Inventors: Sayantan Roy, Houston, TX (US); Anil K. Sadana, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/391,031

(22) Filed: Dec. 27, 2016

(65) Prior Publication Data
US 2017/0108123 A1 Apr. 20, 2017

Related U.S. Application Data

(62) Division of application No. 14/527,716, filed on Oct. 29, 2014.

(51) Int. Cl.
| | |
|---|---|
| F16J 15/08 | (2006.01) |
| F16J 15/32 | (2016.01) |
| F16J 15/02 | (2006.01) |
| E21B 33/12 | (2006.01) |
| E21B 41/00 | (2006.01) |
| C22F 1/10 | (2006.01) |

(Continued)

(52) U.S. Cl.
CPC ............ *F16J 15/0806* (2013.01); *C22C 14/00* (2013.01); *C22C 19/007* (2013.01); *C22C 19/03* (2013.01); *C22F 1/10* (2013.01); *E21B 33/1212* (2013.01); *E21B 41/00* (2013.01); *F16J 15/022* (2013.01); *F16J 15/0887* (2013.01); *F16J 15/328* (2013.01); *F16J 15/3284* (2013.01); *E21B 33/12* (2013.01); *E21B 2033/005* (2013.01); *F16J 15/3204* (2013.01)

(58) Field of Classification Search
CPC .... F16J 15/022; F16J 15/0806; F16J 15/0887; F16J 15/32; F16J 15/3283; F16J 15/3284; E21B 33/1212; E21B 2033/005
See application file for complete search history.

(56) References Cited

U.S. PATENT DOCUMENTS

| | | |
|---|---|---|
| 4,445,694 A | 5/1984 | Flaherty |
| 4,477,087 A | 10/1984 | Sutter, Jr. et al. |

(Continued)

OTHER PUBLICATIONS

Summit Materials LLC Website, "60 NiTiNOL", available http://www.summitmaterials.com/60-nitinol/ retrieved Aug. 12, 2016, published before Sep. 23, 2014 according to https://web.archive.org/web/20140923090103/http:/www.summitmaterials.com/60-nitinol/.

(Continued)

*Primary Examiner* — Nicholas L Foster
(74) *Attorney, Agent, or Firm* — TraskBritt

(57) ABSTRACT

A superelastic metal seal for use in a downhole tool, wherein the superelastic metal seal may be formed from a superelastic Ni—Ti alloy. The superelastic Ni—Ti alloy may be prestrained with a permanent strain. Superelasticity may be imparted to the superelastic Ni—Ti alloy through a thermal treatment process or through prestraining the superelastic Ni—Ti alloy. The superelastic Ni—Ti alloy may exhibit superelastic behavior. The superelastic Ni—Ti alloy may not exhibit shape memory behavior.

20 Claims, 8 Drawing Sheets

(51) Int. Cl.
    *C22C 19/03*     (2006.01)
    *F16J 15/3284*   (2016.01)
    *F16J 15/328*    (2016.01)
    *C22C 19/00*     (2006.01)
    *C22C 14/00*     (2006.01)
    F16J 15/3204     (2016.01)
    E21B 33/00       (2006.01)

(56) References Cited

U.S. PATENT DOCUMENTS

| | | |
|---|---|---|
| 5,199,497 A | 4/1993 | Ross |
| 5,226,683 A | 7/1993 | Julien et al. |
| 6,393,765 B1 | 5/2002 | Goldstein et al. |
| 2002/0074742 A1 | 6/2002 | Quoiani |
| 2002/0113380 A1 | 8/2002 | Clark |
| 2002/0187020 A1 | 12/2002 | Julien |
| 2004/0194970 A1 | 10/2004 | Eatwell et al. |
| 2005/0109502 A1 | 5/2005 | Buc Slay et al. |
| 2012/0286480 A1 | 11/2012 | Efremov |
| 2013/0131210 A1 | 5/2013 | Gerrard et al. |

OTHER PUBLICATIONS

Summit Materials LLC Website, "SM-1—", available http://www/summitmaterials.com/sm-100/, published before Oct. 7, 2012 according to https://web.archive.org/web/20121007232945/http://www.summitmaterials.com/sm-100.

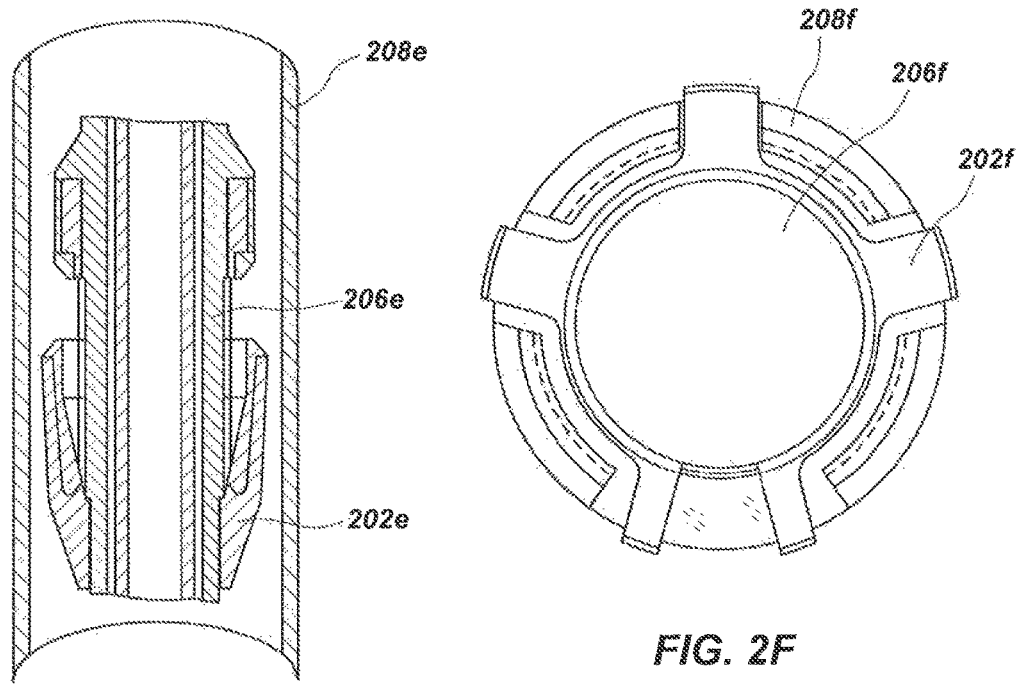
FIG. 2E
FIG. 2F
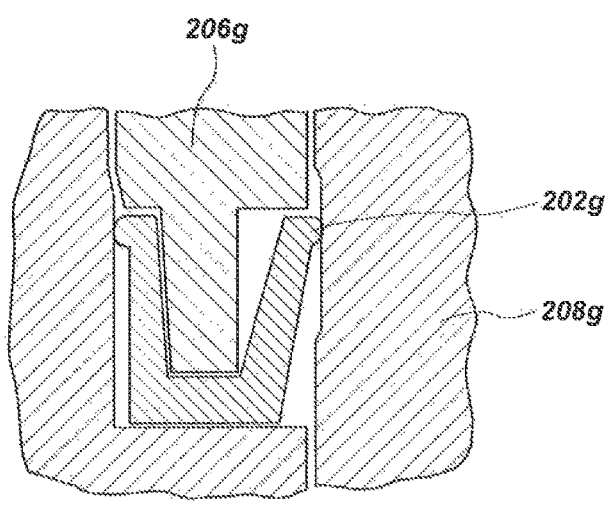
FIG. 2G

METHODS OF FORMING SUPERELASTIC SEALS

CROSS-REFERENCE TO RELATED APPLICATION

This application is a divisional of U.S. patent application Ser. No. 14/527,716, filed Oct. 29, 2014, now, U.S. Pat. No. 9,611,937, issued Apr. 4, 2017, the disclosure of which is hereby incorporated herein in its entirety by this reference.

TECHNICAL FIELD

Embodiments of the present disclosure relate to superelastic metal seals for use in downhole tools, wellbore tools including such superelastic metal seals, and methods of making such seals and tools.

BACKGROUND

Wellbores are formed in subterranean formations for various purposes including, for example, extraction of oil and gas from the subterranean formation and extraction of geothermal heat from the subterranean formation. Wellbores may be formed in a subterranean formation using various types of drill bits along with other wellbore tools. The downhole environment can be harsh, with temperatures as high as 175° C. or more, pressures as high as 100 MPa or more, and the presence of corrosive fluids, such as $H_2S$ and $CO_2$. Wellbore tools and the components thereof must be able to withstand such extreme pressures, temperatures and corrosive fluids. Furthermore, drilling of the subterranean formation utilizes solids-laden drilling fluid and generates extensive debris in the form of formation cuttings, all of which may be carried within the pressurized drilling fluid. Wellbore tools may be subjected to prolonged contact with such abrasive, pressurized drilling fluid.

Many downhole tools include components that need to be isolated from exposure to pressurized drilling fluid. Thus, seals are provided between adjacent components of such tools to prevent the pressurized drilling fluid from flowing between the adjacent components. In some tools, the adjacent components may be configured to move relative to one another. Seals between such components are referred to as "dynamic" seals, whereas seals between adjacent components that do not move relative to one another are referred to as "static" seals. The seal is established by providing a fluid-tight joint between the components that is intended to prevent migration of liquids and/or gases through the interface between the components. Wellbore tools commonly utilize various polymeric, elastomeric, and metals seals to provide both static and dynamic sealing between stationary and moving components, respectively.

For metal-on-metal seals, soft metals such as copper and lead are commonly used. Other examples of metal-on-metal seals used in wellbore tools include shape memory alloys that exhibit one-way shape memory or two-way shape memory behaviors. Shape memory alloys exhibiting "remembered" states and deformed shape memory alloys may return to the "remembered" states when heated.

Once drilling and forming operations of wells are completed, downhole assemblies often use completion tools to extract natural resources from the subterranean formation for long periods of time. Therefore, completion tools often require components that can perform for at least two to twenty years. As discussed above, downhole environments can be harsh, with temperatures as high as 175° C. or more, pressures as high as 100 MPa or more, and the presence of corrosive fluids, such as $H_2S$ and $CO_2$. Completion tools and the components thereof must be able to withstand such extreme pressures, temperatures, heavy brines, and corrosive fluids for as long as possible. Previously known seals, such as, elastomeric and copper metal seals are not knows to withstand such extreme environments for the requisite time periods and often require multiple replacements over a life of the well.

BRIEF SUMMARY

In one embodiment, the present disclosure includes a superelastic metal seal for use in a downhole tools like, for example, a completion tool. The superelastic metal seal may comprise a superelastic Ni—Ti alloy having, by weight percent, about 65% to about 58% nickel (Ni) and about 35% to about 42% titanium (Ti). The superelastic Ni—Ti alloy may be prestrained with at least approximately a 1% permanent strain.

In another embodiment, the present disclosure includes a downhole tool. The downhole tool may include at least one component and a superelastic metal seal disposed adjacent the at least one component. The superelastic metal seal may comprise a superelastic Ni—Ti alloy including, by weight percent, about 65% to about 58% nickel (Ni) and about 35% to about 42% titanium (Ti). The superelastic Ni—Ti alloy may exhibit superelastic behavior within a temperature range of about 120° C. to about 205° C. and does not exhibit shape memory behavior.

In yet another embodiment, the present disclosure includes a method of forming a superelastic metal seal for use in a downhole tool. The method may include forming a Ni—Ti alloy having, by weight percent, 65% to 58% nickel (Ni) and 35% to 42% titanium (Ti). The method may further include imparting superelasticity to the Ni—Ti alloy and causing the Ni—Ti alloy to exhibit superelastic behavior.

BRIEF DESCRIPTION OF THE DRAWINGS

FIGS. 2A through 2G are a cross-sectional schematic illustrations of superelastic metal seals according to different embodiments of the present disclosure.

DETAILED DESCRIPTION

The illustrations presented herein are not meant to be actual views of any particular superelastic metal seal of a downhole tool, but are merely idealized representations that are used to describe embodiments of the disclosure.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

Embodiments of the present disclosure include superelastic metal seals for use in downhole tools like, for example, a completion tool. The superelastic metal seals may be formed from a superelastic Ni—Ti alloy, which may be prestrained with a permanent strain to impart superelasticity to the Ni—Ti alloy.

Figure 1:
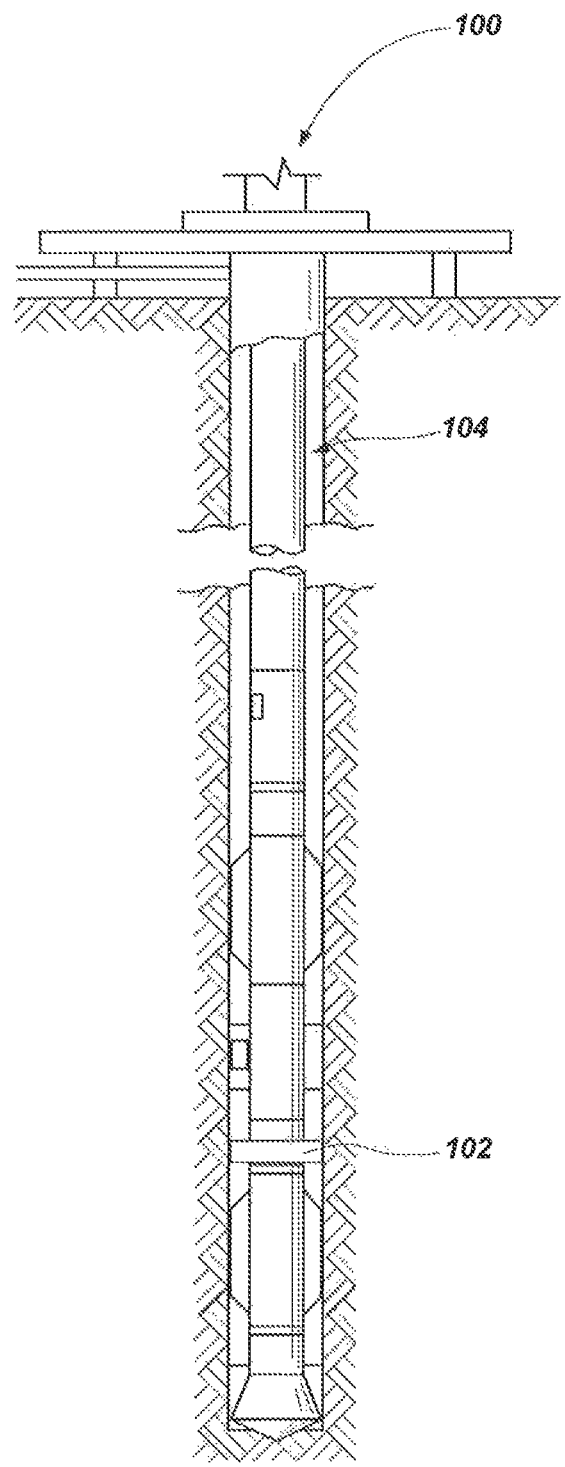
FIG. 1 is a simplified and schematically illustrated side view of a downhole tool assembly within a wellbore that includes a superelastic metal seal according to an embodiment of the present disclosure.

FIG. 1 is a simplified and schematically illustrated side view of a downhole tool assembly 100 within a wellbore that includes a superelastic metal seal 102 according to an embodiment of the present disclosure. In some embodiments, the downhole tool assembly 100 may be disposed within a borehole 104 in a subterranean formation. As a non-limiting example, the superelastic metal seal 102 may be disposed in production equipment, such as between production pipe and the wellbore casing, or between concentric casings. In some embodiments, the superelastic metal seal 102 may comprise one or more of an O-ring, C-ring, D-seal, T-seal, V-seal, X-seal, flat seal, lip seal, cup seal, back-up ring, bonded seal, and a packing element. Non-limiting examples are described below with reference to FIGS. 2A through 2G.

Figure 2A:
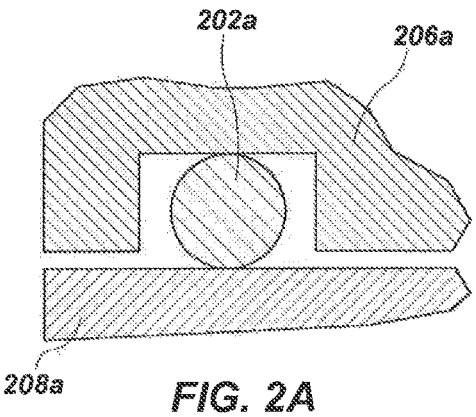

FIG. 2A is a cross-sectional schematic illustration of a superelastic metal seal 202a according to an embodiment of the present disclosure. The superelastic metal seal 202a may be disposed between a first component 206a and a second component 208a of a downhole tool assembly. The superelastic metal seal 202a may comprise an O-ring in some embodiments.

Figure 2B:
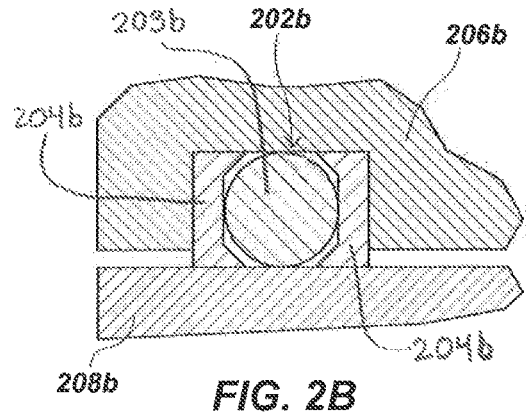

FIG. 2B is a cross-sectional schematic illustration of a superelastic metal seal 202b according to another embodiment of the present disclosure. The superelastic metal seal 202b may be disposed between a first component 206b and a second component 208b of a downhole tool assembly. The superelastic metal seal 202b may comprise an O-ring 203b and back-up rings 204b.

Figure 2C:
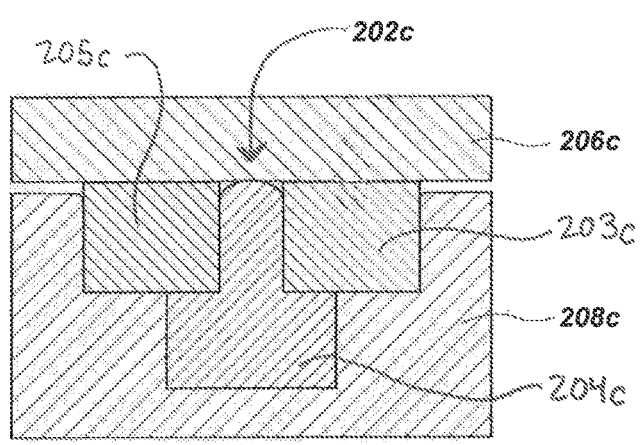

FIG. 2C is a cross-sectional schematic illustration of a superelastic metal seal 202c according to another embodiment of the present disclosure. The superelastic metal seal 202c may be disposed between a first component 206c and a second component 208c of a downhole tool assembly. The superelastic metal seal 202c may comprise a T-seal. The T-seal may comprise multiple sealing portions including portions 203c, 204c, and 205c.

Figure 2D:
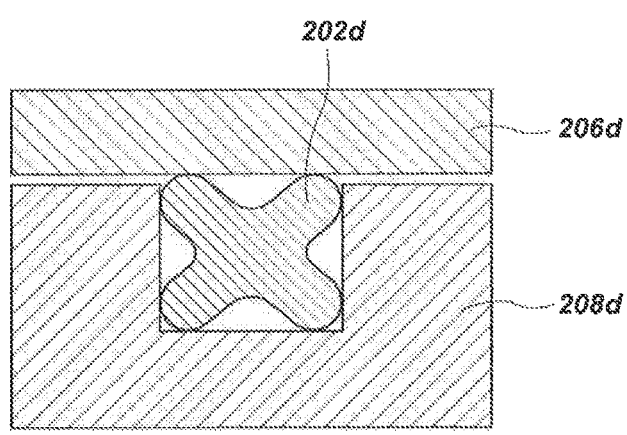

FIG. 2D is a cross-sectional schematic illustration of a superelastic metal seal 202d according to another embodiment of the present disclosure. The superelastic metal seal 202d may be disposed between a first component 206d and a second component 208d of a downhole tool assembly. The superelastic metal seal 202d may comprise an X-seal (i.e., may have an x-shaped cross-sectional shape).

FIG. 2E is a cross-sectional schematic illustration of a superelastic metal seal 202e according to another embodiment of the present disclosure. The superelastic metal seal 202e may be disposed between a first component 206e and a second component 208e of a downhole tool assembly. The superelastic metal seal 202e may comprise a packing element.

FIG. 2F is a cross-sectional schematic illustration of a superelastic metal seal 202f according to another embodiment of the present disclosure. The superelastic metal seal 202f may be disposed between a first component 206f and a second component 208f of a downhole tool assembly. The superelastic metal seal 202f may comprise a C-ring.

FIG. 2G is a cross-sectional schematic illustration of a superelastic metal seal 202g according to another embodiment of the present disclosure. The superelastic metal seal 202g may be disposed between a first component 206g and a second component 208g of a downhole tool assembly. The superelastic metal seal 202g may comprise a U-seal, D-seal, V-seal, or cup seal.

It is understood that the first and second components of FIGS. 2A-2G may include any part of a drill string, completion tool, casing, or any other part of a downhole tool assembly 100 (FIG. 1).

The configurations of seals shown in FIGS. 2A through 2G are merely non-limiting examples of seals that may comprise a superelastic metal alloy as disclosed herein, and seal members comprising a superelastic metal alloy as disclosed herein may have any configuration and may be used in any wellbore tool, equipment, or assembly.

Referring again to FIG. 1, in some embodiments, the superelastic metal seal 102 may be formed of a superelastic nickel-titanium (hereinafter "Ni—Ti") alloy. In some embodiments, the superelastic Ni—Ti alloy may include, by weight percent, about 58% to about 65% Nickel (Ni) and about 35% to about 42% Titanium (Ti). As a non-limiting example, the superelastic Ni—Ti alloy may include, by weight percent, about 60% Ni and about 40% Ti. The superelastic Ni—Ti alloy optionally may include small or trace amounts of additional elements, so long as the alloy continues to exhibit superelastic behavior. For example, in some embodiments, the superelastic Ni—Ti alloy may also include amounts of one or more of tungsten (W), cobalt (Co), copper (Cu), aluminum (Al), zinc (Zn), gold (Au), iron (Fe), silicon (Si), beryllium (Be), and manganese (Mn).

The superelastic Ni—Ti alloy of the superelastic metal seal 102 may exhibit superelastic behavior. As used herein, the terms "superelastic behavior" mean that the alloy at least substantially elastically recovers from a strain of at least about 10% when tested according to ASTM Test Method D395. The superelastic behavior may be induced in the Ni—Ti alloy using thermal treatment process and/or by applying physical stress to the alloy.

Although the superelastic Ni—Ti alloy may have a relatively high titanium content, the superelastic Ni—Ti alloy may not exhibit galling during use as a metal-on-metal seal.

The superelastic Ni—Ti alloy may exhibit superelastic behavior while being deformed from an undeformed state to a deformed state by a load, and at least substantially recovering to the undeformed state upon release of the load. In some embodiments, the superelastic Ni—Ti alloy may be elastically deformed from the undeformed state to the deformed state through a loading process. The superelastic Ni—Ti alloy may at least substantially recover from the elastically deformed state back to the undeformed state through a recovery process.

In some embodiments, the loading process may include subjecting the superelastic Ni—Ti alloy to a load including a tensile stress. In other embodiments, the loading process may include subjecting the superelastic Ni—Ti alloy to a load including a compressive stress. Furthermore, the loading process may include subjecting the superelastic Ni—Ti alloy to a load including one or more of a torsion stress, axial stress, tensile strain, or compressive strain. In other embodiments, the loading process may include subjecting the superelastic Ni—Ti alloy to a load including strains and stresses placed on the superelastic Ni—Ti alloy when used as a superelastic metal seal 102 (FIG. 1) and to provide sealing functions in the downhole tool assembly 100 (FIG. 1).

In some embodiments, the superelastic Ni—Ti alloy may, during the recovery process, at least substantially recover from the deformed state to the undeformed state by at least 80%. In other words, at least 80% of the strain induced in the superelastic Ni—Ti alloy by loading may be elastically recovered upon release of the load. In other embodiments, at least 90% of the strain induced in the superelastic Ni—Ti alloy by loading may be elastically recovered upon release of the load. In yet other embodiments, at least 95% of the strain induced in the superelastic Ni—Ti alloy by loading may be elastically recovered upon release of the load. In yet other embodiments, at least 98% of the strain induced in the superelastic Ni—Ti alloy by loading may be elastically recovered upon release of the load.

In some embodiments, the superelastic Ni—Ti alloy may, during the recovery process, at least substantially recover to the undeformed state from the deformed state after experiencing strains of at least 10% during the loading process.

In some embodiments, the superelastic Ni—Ti alloy may have a microcrystalline structure including a martensitic phase. In some embodiments, the superelastic Ni—Ti alloy may have a microcrystalline structure including an austenitic phase. In other embodiments, the superelastic Ni—Ti alloy may have a microcrystalline structure including both an austenitic phase and a martensitic phase. Furthermore, the superelastic Ni—Ti alloy may exhibit the superelastic behavior throughout the temperature range extending from about 120° C. to about 205° C. In other embodiments, the superelastic Ni—Ti alloy may exhibit the superelastic behavior throughout the temperature range extending from about 20° C. to about 500° C. The equilibrium phase of Ni—Ti alloys may transform from a martensitic phase to an austenitic phase at a phase transformation temperature, and, thus, the phase composition of the microstructure of the superelastic Ni—Ti alloy may depend at least partially on the temperature of the Ni—Ti alloy.

The superelastic Ni—Ti alloy may exhibit transformation temperatures of an Austenite start temperature (As) of about 38° C. and an Austenite finish temperature (Af) of about 57° C. The Austenite start temperature (As) is a temperature at which a transformation from martensite to austenite of the microcrystalline structure begins on heating. The Austenite finish temperature (Af) is a temperature at which a transformation from martensite to austenite of the microcrystalline structure finishes on heating.

In some embodiments, it may be necessary to prestrain the Ni—Ti alloy with a small degree of permanent deformation to ensure that the Ni—Ti alloy will exhibit superelasticity. Thus, in some embodiments, superelasticity may be imparted to the Ni—Ti alloy by prestraining the Ni—Ti alloy, as described in further detail in relation to FIGS. 5, 6, 8, and 9.

In some embodiments, only portions of the superelastic metal seal 102 (FIG. 1) may experience the loading process and the recovery process. In other words, some portions of the superelastic Ni—Ti alloy forming the superelastic metal seal 102 (FIG. 1) may remain in an undeformed state while other portions are deformed to a deformed state and then elastically recovered to an undeformed state.

The superelastic Ni—Ti alloy of the superelastic metal seal 102 (FIG. 1) may not exhibit shape memory behavior. As used herein, "shape memory behavior" is defined as: a behavior exhibited by an alloy such that the alloy returns to a remembered austenitic phase from a martensite phase upon being heated or energized in some manner. The superelastic Ni—Ti alloy compositions described herein do not exhibit shape memory behavior, but rather exhibit superelastic behavior.

A superelastic metal seal formed of and comprising the superelastic Ni—Ti alloy may have improved sealing properties compared to known polymeric seals. For example, the superelastic Ni—Ti alloy may be able to provide sealing properties in high-pressure, high-temperature, and/or corrosive environments not amenable to use of polymeric seals. Seals using conventional polymeric materials maintain stability only up to a temperature of about 260° C., whereas the superelastic Ni—Ti alloy may remain stable at least up to a temperature of 500° C. Furthermore, for example, in comparison to glass filled polyetheretherketone (PEEK), a high performance thermoplastic, the superelastic Ni—Ti alloy may provide a more stable seal in downhole conditions. In wellbore production assemblies, polymeric seals are often used to provide a seal between the production pipe and the wellbore casing. The polymeric seals typically include a primary elastomeric seal, with so-called "backup" seals disposed on opposing sides of the primary elastomeric seal. The backup seals often comprise PEEK, and are used to prevent extrusion of the primary elastomeric seal out from the sealing area.

In comparison to glassed filled PEEK, the Ni—Ti alloy remains stable at least up to a temperature of 500° C., while glass filled PEEK has a melting temperature of about 340° C. Thus, compared to polymeric materials, the superelastic Ni—Ti alloy may provide better sealing properties in high temperature conditions, such as, conditions often experienced in downhole operations. Furthermore, when used as a primary seal, the superelastic Ni—Ti alloy may eliminate any need for back up seals.

The superelastic Ni—Ti alloy may resist corrosion when used in highly corrosive environments. For example, in some embodiments, the superelastic Ni—Ti alloy may exhibit a corrosion rate of about a 520 mils/year (~13.2 mm/year) thickness loss when tested in a 5% HCl solution at about 20° C. The superelastic Ni—Ti alloy may further demonstrate a resistance to corrosion in salt water and may have a higher corrosion resistance in environments having Hydrogen Sulfide ($H_2S$), compared to copper and copper alloys.

Figure 3:
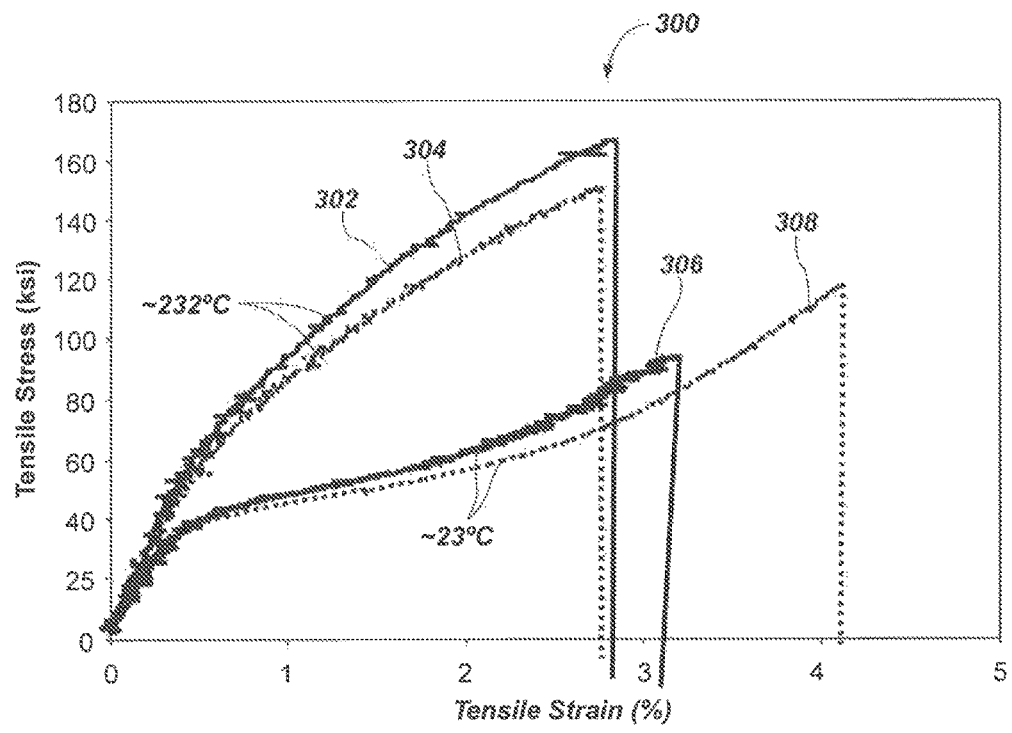
FIG. 3 is a stress-strain diagram comparing stress-strain behavior of different specimens of a superelastic Ni—Ti alloy of the present disclosure at different temperatures.

FIG. 3 is a stress-strain diagram comparing stress-strain behavior of different specimens of a superelastic Ni—Ti alloy of the present disclosure at different temperatures. FIG. 3 includes a graph 300 showing stress-strain curves of four different specimens of the superelastic Ni—Ti alloy stressed to failure at different temperatures. The specimens were tested according to ASTM specification D638 standard test using type 5 dogbones. Lines 302, 304, 306, and 308 represent specimens one, two, three, and four, respectively. Specimens one and two were tested at about 202° C., and specimens three and four were tested at about 20° C. As can be seen from the graph 300, the superelastic Ni—Ti alloy may exhibit a higher ultimate tensile strength at about 202° C. than at about 20° C. Therefore, the superelastic Ni—Ti may exhibit higher ultimate tensile strengths at higher temperatures. Additionally, as can be seen from the graph 300, the superelastic Ni—Ti alloy may be able to withstand higher strains at about 20° C. than at about 202° C. Furthermore, as can be seen from the graph 300, the superelastic Ni—Ti alloy may exhibit substantially the same elastic modulus at different temperatures during small strain deformation. As a non-limiting example, the superelastic Ni—Ti alloy may exhibit substantially that same elastic modulus throughout the temperature range extending from about 20° C. to about 200° C., within a strain range extending from about 0% to about 0.5%.

Figure 4:
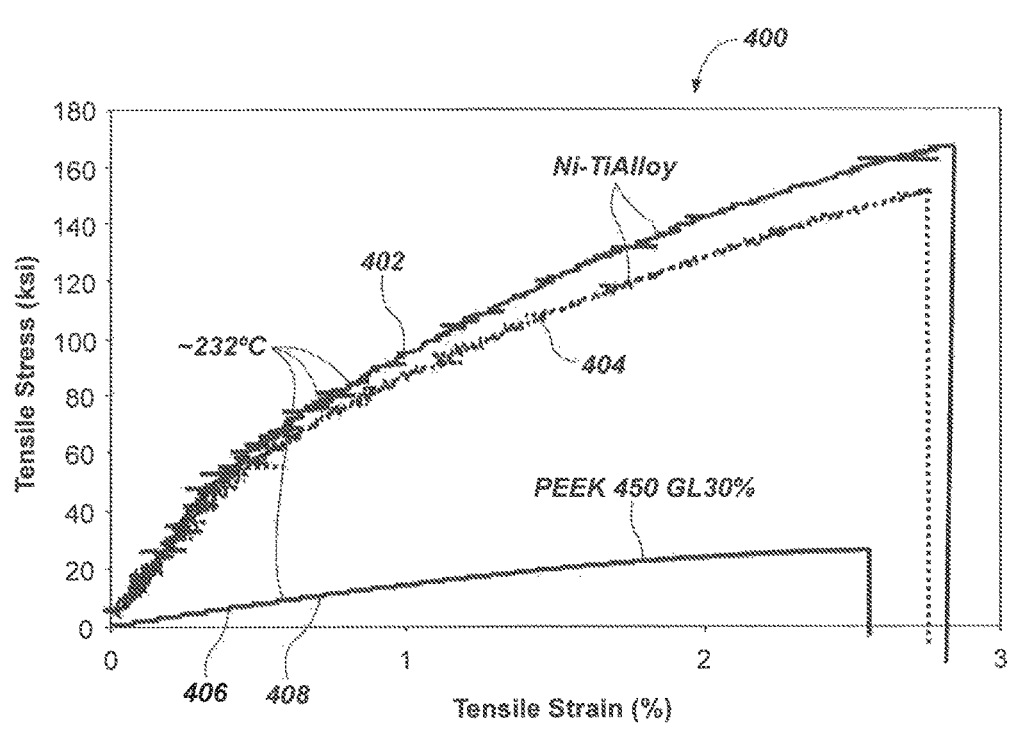
FIG. 4 is a stress-strain diagram comparing stress-strain behavior of a superelastic Ni—Ti alloy of the present disclosure with that of polyetheretherketone (PEEK).

FIG. 4 is a stress-strain diagram comparing stress-strain behavior of a superelastic Ni—Ti alloy of the present disclosure with that of polyetheretherketone (PEEK). FIG. 4 includes a graph 400 showing stress-strain curves of two different specimens of the superelastic Ni—Ti alloy and two different specimens of PEEK stressed to failure at about 202° C. The specimens were tested according to ASTM specification D638 standard test using type 5 dogbones. Lines 402 and 404 represent a first and second specimen of the superelastic Ni—Ti alloy. Lines 406 and 408 represent a first and second specimen of PEEK. As can be seen from the graph 400, the superelastic Ni—Ti alloy may exhibit a higher ultimate tensile strength than an ultimate tensile strength exhibited by PEEK. For example, at temperatures around 202° C., the superelastic Ni—Ti alloy may exhibit an ultimate tensile strength of about 150 ksi compared to an ultimate tensile strength of about 20 ksi exhibited by PEEK. Furthermore, as can be seen when comparing the graph 300 from FIG. 3 and the graph 400 from FIG. 4, a lower ultimate tensile strength exhibited by the superelastic Ni—Ti alloy when tested at about 20° C. may still be substantially higher than the ultimate tensile strength exhibited by PEEK at 202° C. Furthermore, although not shown in the figures, other known materials used for metal-on-metal seals such as copper and copper alloys normally demonstrate average ultimate tensile strengths of less than about 80 ksi when tested at room temperature. Thus, the superelastic Ni—Ti alloy may have a higher ultimate tensile strength and may provide better sealing properties in downhole assemblies, compared to other known materials used as seals, such as PEEK, copper, and copper alloys.

Figure 5:
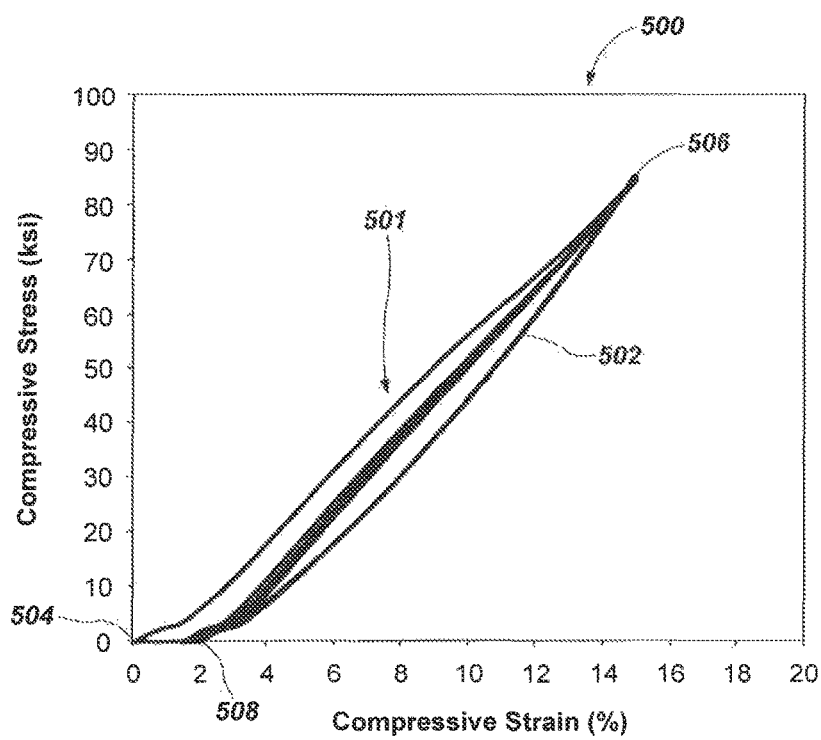
FIG. 5 shows a hysteresis loop in a stress-strain diagram for a superelastic Ni—Ti alloy of the present disclosure.

FIG. 5 shows a hysteresis loop in a stress-strain diagram for a superelastic Ni—Ti alloy of the present disclosure. FIG. 5 includes a graph 500 showing a hysteresis curve 501 of a specimen of the superelastic Ni—Ti alloy. The specimen of the superelastic Ni—Ti alloy represented by the hysteresis curve 501, which has a Rockwell hardness of HRC 35-40, was tested according to ASTM specification D575. The hysteresis curve 501 includes a stress-strain line 502 that extends from a starting point 504 to a loaded point 506, then back to a first recovery point 508, and then through repeated hysteresis loops between the loaded point 506 and recovery points. As can be seen from the hysteresis curve 501, the superelastic Ni—Ti alloy may demonstrate an at least substantial elastic recovery after experiencing an initial compressive stress and compressive strain. For example, the superelastic Ni—Ti alloy may demonstrate an at least substantial recovery after experiencing an initial compressive stress of at least 80 ksi and compressive strain of at least 15%. Additionally, as shown by the hysteresis curve 501, after experiencing an initial load and initial recovery, the superelastic Ni—Ti alloy may continue to at least substantially elastically recover through multiple load cycles. In some embodiments, after experiencing a permanent strain, the superelastic Ni—Ti alloy may continue to elastically recover by at least 90% through multiple load cycles of at least 80 ksi and a compressive strain of 15%. In other embodiments, the superelastic Ni—Ti alloy may continue to elastically recover by at least 95%. In yet other embodiments, the superelastic Ni—Ti alloy may continue to elastically recover by at least 98%.

Furthermore, as can be seen from the hysteresis curve 501, after an initial load and subsequent removal of the load, the superelastic Ni—Ti alloy may retain a relatively small amount of permanent strain. For example, after an initial load and subsequent removal of the load, the superelastic Ni—Ti alloy may retain a permanent strain of about 1.75%. In other embodiments, after an initial load and subsequent removal of the load, the superelastic Ni—Ti alloy may retain a permanent strain of about 0.5%, about 1.0%, or about 1.5%. In other embodiments, after an initial load and subsequent removal of the load, the superelastic Ni—Ti alloy may retain a permanent strain of at least about 1.75%.

Moreover, as shown in the hysteresis curve 501, upon subsequent strains of up to 10% or more, the superelastic Ni—Ti alloy may not exhibit any subsequent significant additions to the permanent strain. In some embodiments, after an initial load and initial permanent strain, the superelastic Ni—Ti alloy may exhibit an additional permanent strain of less than 0.25% during at least five subsequent load cycles. In other embodiments, after an initial load and initial permanent strain, the superelastic Ni—Ti alloy may exhibit an additional permanent strain of less than 0.2% during at least five subsequent load cycles. In yet other embodiments, after an initial load and initial permanent strain, the superelastic Ni—Ti alloy may exhibit an additional permanent strain of less than 0.15% during at least five subsequent load cycles. In yet other embodiments, after an initial load and initial permanent strain, the superelastic Ni—Ti alloy may exhibit an additional permanent strain of less than 0.1% during at least five subsequent load cycles.

Although depicted in FIG. 3 as being imparted through physically applied stresses, the permanent strain may also be imparted through a thermal treatment process. The thermal treatment process is described in further detail in relation to FIGS. 8 and 9.

As a non-limiting example, when tested according to the above described hysteresis test, a button made of the superelastic Ni—Ti alloy having a Rockwell hardness of HRC 35-40 and having dimensions of about 12.7 mm in diameter and about 6.4 mm in length may demonstrate about a 0.11 mm reduction in length or 1.75% permanent strain after an initial load. Thereafter, upon subsequent loads, the button may not exhibit any subsequent significant reductions in length or additions to permanent strain. In some embodiments, during at least five subsequent load cycles, the button may exhibit a reduction in length of less than 0.015 mm or an addition of less than 0.25% permanent strain.

Furthermore, in some embodiments, the superelastic Ni—Ti alloy may have a Rockwell hardness of about HRC 35-40. In other embodiments, the superelastic Ni—Ti alloy may have a Rockwell hardness of about HRC 40-45. In yet other embodiments, the superelastic Ni—Ti alloy may have a Rockwell hardness of about HRC 45-56. In yet other embodiments, the superelastic Ni—Ti alloy may have a Rockwell hardness of about HRC 56-62. In yet other embodiments, the superelastic Ni—Ti alloy may have a Rockwell hardness of greater than about HRC 62.

Brines are often used in completion operations to assist in the production of hydrocarbons from the formation. Brines can increase production and result in faster recovery, when compared to fresh water or "mud" production fluids. Furthermore, brine densities are often increased or decreased based on down-hole conditions, and to optimize the production of hydrocarbons from the formation. Higher downhole temperatures often require higher density brines. Higher density brines, however, tend to be more corrosive. The superelastic Ni—Ti alloy may exhibit improved sealing performance and/or longer usable lifetimes relative to previously known seals in high temperature, heavy brine environments. The superelastic Ni—Ti alloy may not significantly degrade and may retain sealing properties in heavy brine environments, which may include one or more of KCl, NaCl, $CaCl_2$, $CaBr_2$, and $ZnBr_2$. For example, the superelastic Ni—Ti alloy may continue to exhibit substantially the same superelastic behavior after being subjected to a HyCal III production fluid (available from Baker Hughes Drilling Fluids of Houston, Tex.) at about 315° C. (600° F.) for seven days. Furthermore, the superelastic Ni—Ti alloy may exhibit a weight reduction of only 0.09% after being subjected to a HyCal III solution at about 315° C. (600° F.) for seven days. Therefore, the superelastic Ni—Ti alloy may provide better sealing properties during completion operations, which often use heavy brines like HyCal III, when compared to conventional elastomeric, polymeric, and metal-on-metal seals.

Figure 6:
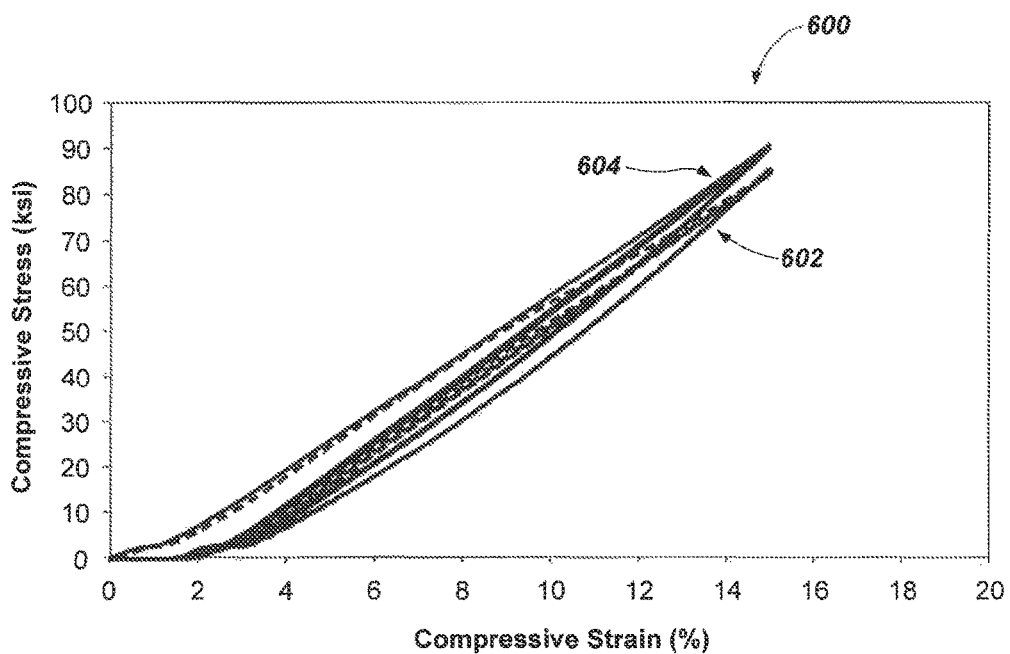
FIG. 6 shows hysteresis loops in stress-strain diagrams for a Ni—Ti alloy specimen that has been previously subjected to heavy brine and a Ni—Ti alloy specimen that has not been previously subjected to heavy brine.

FIG. 6 includes a graph 600 showing hysteresis curves of a normal specimen of the superelastic Ni—Ti alloy and specimen of the superelastic Ni—Ti alloy, which has been previously subjected to aging in HyCal III production fluid at about 315° C. (600° F.) for seven days (hereinafter "chemically aged"). Hysteresis curves 602 and 604 represent the normal specimen and chemically aged specimen of the superelastic Ni—Ti alloy, respectively. As shown in FIG. 6, the chemically aged specimen of the superelastic Ni—Ti alloy may exhibit substantially the same superelastic behavior as the normal superelastic Ni—Ti alloy. Furthermore, the chemically aged specimen of the superelastic Ni—Ti alloy may demonstrate an at least substantial recovery after experiencing an initial compressive stress and compressive strain. For example the chemically aged specimen of the superelastic Ni—Ti alloy may demonstrate an at least substantial recovery after experiencing an initial compressive stress of at least 80 ksi and compressive strain of at least 15%. Additionally, as shown by the hysteresis curves 602 and 604, after experiencing an initial load and initial recovery, the chemically aged specimen of the superelastic Ni—Ti alloy may continue to at least substantially recover through multiple load cycles in at least substantially a same manner as the normal specimen of the superelastic Ni—Ti alloy. For example, in some embodiments, after experiencing a permanent strain, the chemically aged specimen of the superelastic Ni—Ti alloy may continue to recover by at least 90% through multiple load cycles of at least 80 ksi and a compressive strain of 15%. In other embodiments, the chemically aged specimen of the superelastic Ni—Ti alloy may continue to recover by at least 95%. In yet other embodiments, the chemically aged specimen of the superelastic Ni—Ti alloy may continue to recover by at least 98%.

Furthermore, as can be seen from the hysteresis curves 602 and 604, after an initial load and subsequent removal of the load, the chemically aged specimen of the superelastic Ni—Ti alloy may retain a permanent strain similar to a permanent strain retained by the normal superelastic Ni—Ti alloy. Moreover, as shown by the hysteresis curves 602 and 604, upon subsequent loads, the chemically aged specimen of the superelastic Ni—Ti alloy may not exhibit any greater subsequent additions to the permanent strain than exhibited by the normal specimen of the superelastic Ni—Ti alloy. As can be seen from FIG. 6, the superelastic Ni—Ti alloy exhibits substantially the same behavior prior to being subjected to heavy brines and after being subjected to heavy brines.

Figure 7:
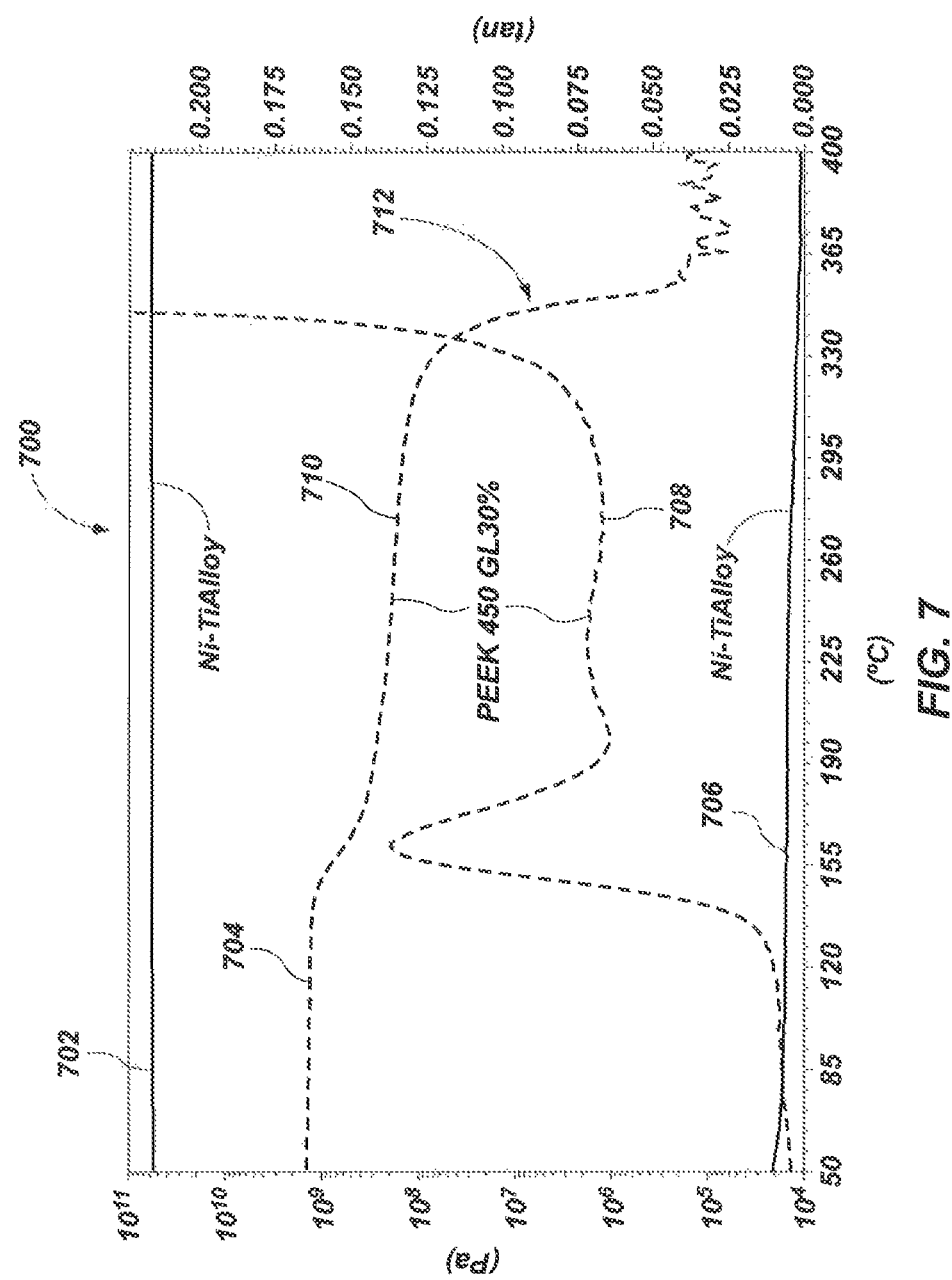
FIG. 7 shows a graph of storage modulus and loss modulus versus temperature for both a superelastic Ni—Ti alloy of the present invention and PEEK.

FIG. 7 shows a graph of storage modulus and loss modulus versus temperature for both a superelastic Ni—Ti alloy of the present invention and PEEK. Dynamic Mechanical Analysis (DMA) subjects materials to small deformations in a cyclic manner (sinusoidal deformation). DMA further monitors and records material modulus at different temperatures. Furthermore, in DMA, a measure of an elastic behavior of the material is depicted as a storage modulus curve of the material. Moreover, in DMA, a tangent delta line may be included, which represents a ratio of a loss modulus of the material to the storage modulus of the material. Furthermore, the tangent delta line of the material also represents a measure of an energy dissipation of the material as a function of the temperature.

FIG. 7 includes a graph 700 showing DMA results of a specimen of the superelastic Ni—Ti alloy and a specimen of PEEK. The graph 700 includes a storage modulus curve 702 for the superelastic Ni—Ti alloy and a storage modulus curve 704 for PEEK. The graph 700 also includes a first tangent delta line 706 for the superelastic Ni—Ti alloy and second tangent delta line 708 for PEEK. The storage modulus curve 704 for PEEK may include a plateau region 710 and a melting region 712. The first tangent delta line 706 for the superelastic Ni—Ti alloy may represent a ratio of a loss modulus of the superelastic Ni—Ti alloy to the storage modulus of the superelastic Ni—Ti alloy. The first tangent delta line 706 may also represent a measure of an energy dissipation of the superelastic Ni—Ti alloy as a function of the temperature under continual sinusoidal deformation. The second tangent delta line 708 for PEEK may represent a ratio of a loss modulus of PEEK to the storage modulus of PEEK. The second tangent delta line 708 may also represent a measure of an energy dissipation of PEEK as a function of the temperature under continual sinusoidal deformation. As shown in FIG. 7, the elastic behavior or storage modulus curve 702 of the superelastic Ni—Ti alloy may remain substantially constant as a function of the temperature compared to the elastic behavior or storage modulus curve 704 of PEEK. Furthermore, the energy dissipation represented by the first tangent delta line 706 of the superelastic Ni—Ti alloy may be minimal compared to the energy dissipation represented by the second tangent delta line 708 of PEEK. Thus, the superelastic Ni—Ti alloy may provide more consistent elastic behaviors and sealing properties in environments with changing temperatures or high temperatures when compared to PEEK.

Figure 8:
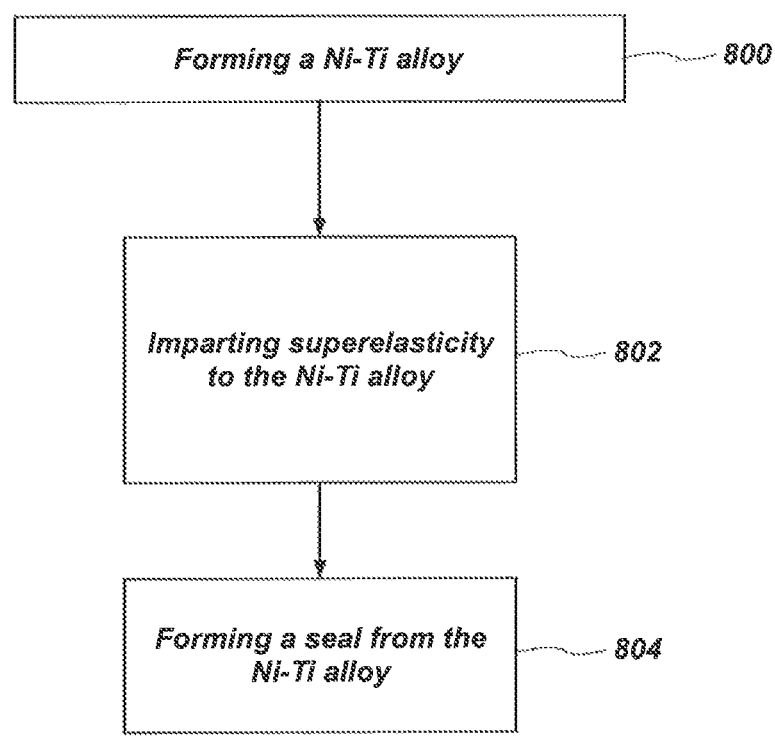
FIG. 8 is a simplified flow chart demonstrating a method of forming superelastic metal seals for use in downhole tools.

FIG. 8 is a simplified flow chart demonstrating a method of forming superelastic metal seals for use in downhole tools. The method may include an activity 800 of forming a Ni—Ti alloy. The Ni—Ti alloy may be formed by one or more of common powder sinter technology, powder metallurgy, vacuum melting, electron beam melting, vacuum arc melting, high frequency vacuum melting in a graphite crucible, vacuum induction melting, or plasma melting. The Ni—Ti alloy may be formed having, by weight percent, about 65% to about 58% Ni and about 35% to about 42% Ti. As a non-limiting example, the Ni—Ti alloy may be formed having, by weight percentage, about 60% Ni and about 40% Ti. After the Ni—Ti alloy is formed, the Ni—Ti alloy may be isostatically pressing and hot rolled to a desired thickness. Hot working the Ni—Ti alloy may be beneficial and may result in the Ni—Ti alloy having higher ductility.

The method of forming a superelastic metal seal may include an activity 802 of imparting superelasticity to the Ni—Ti alloy. Superelasticity may be imparted to the Ni—Ti alloy through a thermal treatment process or through physically applying stresses to the Ni—Ti alloy.

In embodiments using the thermal treatment process to impart superelasticity to the Ni—Ti alloy, after the Ni—Ti alloy is isostatically pressed and hot rolled to a desired thickness, the Ni—Ti alloy may be hardened by rapidly cooling the Ni—Ti alloy. For example, the Ni—Ti alloy may be rapidly cooled by quenching the Ni—Ti in an oil or gas. The rapid cooling may result in permanently straining the Ni—Ti alloy. Furthermore, the rapid cooling may render the Ni—Ti alloy superelastic such that the Ni—Ti alloy exhibits superelastic behavior.

In embodiments using physically applied stresses to impart superelasticity to the Ni—Ti alloy, after the Ni—Ti alloy is isostatically pressed and hot rolled to a desired thickness, the Ni—Ti alloy may be cooled. The Ni—Ti alloy may then be prestrained with a permanent strain. In some embodiments, the Ni—Ti alloy may be prestrained with a permanent strain of at least about 0.5% strain, at least about 1.0% strain, at least about 1.5% strain, or even at least about 1.75% strain. To achieve such a permanent strain, the Ni—Ti may need to be prestrained with about a 2% to about 15% strain or more, after which some of the strain may be elastically recovered upon release of the straining load. In some embodiments, the prestrain may be compressive or tensile or both. Permanently straining the Ni—Ti alloy may render the Ni—Ti alloy superelastic such that the Ni—Ti alloy exhibits superelastic behavior.

As shown in FIG. 8, a seal may be formed that comprises the superelastic Ni—Ti alloy, as shown in activity 804. For example, after superelasticity is imparted to the Ni—Ti, the resulting superelastic Ni—Ti alloy may be formed into a superelastic metal seal. The superelastic Ni—Ti alloy may be formed into in a superelastic metal seal through conventional methods including machining, grinding, cutting, molding, or any other know method of working alloys into desired shapes.

Figure 9:
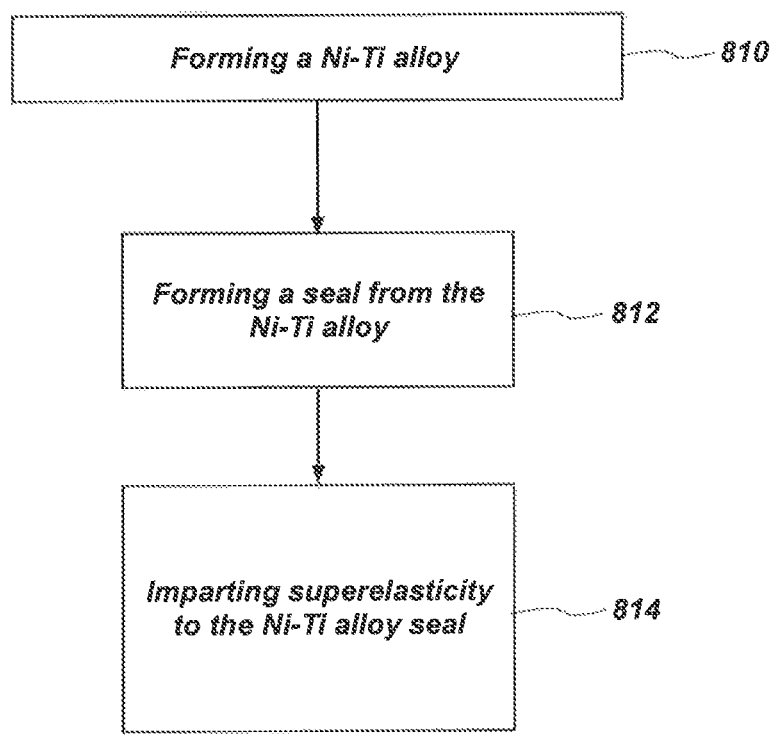
FIG. 9 is a simplified flow chart demonstrating another method of forming superelastic metal seals for use in downhole tools.

FIG. 9 is a simplified flow chart demonstrating another method of forming superelastic metal seals for use in downhole tools. The method may include an activity 810 of forming a Ni—Ti alloy. The Ni—Ti alloy may be formed by any of the methods previously discussed in relation to FIG. 8.

The method may further include an activity 812 of forming a seal from the Ni—Ti alloy prior to imparting superelasticity to the Ni—Ti alloy. For example, after forming the Ni—Ti alloy through one of the above described methods, a resulting Ni—Ti alloy may be formed (e.g., forged, stamped, extruded, molded, etc.) into a desired shape. In some embodiments, the Ni—Ti alloy may be formed into an O-ring, C-ring, D-seal, T-seal, V-seal, X-seal, flat seal, lip seal, cup seal, back-up ring, bonded seal, packing element, or any combination thereof.

The method of forming a superelastic metal seal may include an activity 814 of imparting superelasticity to the Ni—Ti alloy seal at least. Superelasticity may be imparted to the Ni—Ti alloy through any of the above described methods. The Ni—Ti alloy may be rendered superelastic such that the Ni—Ti alloy exhibits superelastic behavior and may result in a superelastic metal seal for use in a downhole assembly.

In some embodiments, the superelastic metal seal may provide a seal between components of a downhole tool. In other embodiments, the superelastic metal seal may provide a seal between a component of the downhole tool, like a production pipe, and a casing of a downhole tool assembly.

The example embodiments of the disclosure described above do not limit the scope of the invention, since these embodiments are merely examples of embodiments of the invention, which is defined by the scope of the appended claims and their legal equivalents. Any equivalent embodiments are encompassed within the scope of this invention. Indeed, various modifications of the disclosure, in addition to those shown and described herein, such as alternate useful combinations of the elements described, will become apparent to those skilled in the art from the description. Such modifications and embodiments are also intended to fall within the scope of the appended claims.

What is claimed is:

1. A method of forming a superelastic metal seal, comprising:
    forming an Ni—Ti alloy comprising from about 58 weight percent Ni to about 65 weight percent Ni and from about 35 weight percent Ti to about 42 weight percent Ti; and
    treating the Ni—Ti alloy to form a superelastic Ni—Ti alloy that is not capable of shape memory behavior.

2. The method of claim 1, wherein treating the Ni—Ti alloy comprises prestraining the Ni—Ti alloy with a strain of at least approximately 2%.

3. The method of claim 1, wherein treating the Ni—Ti alloy comprises hardening the Ni—Ti alloy by rapidly cooling the Ni—Ti alloy after hot working the Ni—Ti alloy.

4. The method of claim 1, further comprising forming the superelastic metal seal into an O-ring shape, a C-ring shape, a D-seal shape, a T-seal shape, a V-seal shape, a X-seal shape, a flat seal shape, a lip seal shape, a cup seal shape, a back-up ring shape, a bonded seal shape, or a packing element shape.

5. The method of claim 1, wherein forming an Ni—Ti alloy comprises forming an alloy comprising about 60 weight percent Ni and about 40 weight percent Ti.

6. The method of claim 1, wherein treating the Ni—Ti alloy to form a superelastic Ni—Ti alloy that is not capable of shape memory behavior comprises forming the superelastic Ni—Ti alloy to exhibit superelastic behavior at least up to a compressive strain of about 10%.

7. The method of claim 1, wherein treating the Ni—Ti alloy to form a superelastic Ni—Ti alloy that is not capable of shape memory behavior comprises forming the superelastic Ni—Ti alloy to exhibit a microcrystalline structure including a martensitic phase.

8. The method of claim 1, wherein treating the Ni—Ti alloy to form a superelastic Ni—Ti alloy that is not capable of shape memory behavior comprises forming the superelastic Ni—Ti alloy to exhibit a microcrystalline structure including an austenitic phase.

9. The method of claim 1, wherein treating the Ni—Ti alloy to form a superelastic Ni—Ti alloy that is not capable of shape memory behavior comprises forming the superelastic Ni—Ti alloy to exhibit a microcrystalline structure including a martensitic phase and an austenitic phase.

10. The method of claim 1, wherein treating the Ni—Ti alloy to form a superelastic Ni—Ti alloy that is not capable of shape memory behavior comprises forming the superelastic Ni—Ti alloy to have a Rockwell hardness of about HRC 35-40, about HRC 40-45, about HRC 45-56, about HRC 56-62, or greater than about HRC 62.

11. The method of claim 1, wherein treating the Ni—Ti alloy to form a superelastic Ni—Ti alloy that is not capable of shape memory behavior comprises forming the superelastic Ni—Ti alloy to substantially resist degradation in the presence of one or more of KCl, NaCl, $CaCl_2$, $CaBr_2$, and $ZnBr_2$.

12. A method of forming a superelastic metal seal, comprising:
   forming an alloy comprising from about 58 weight percent Ni to about 65 weight percent Ni and from about 35 weight percent Ti to about 65 weight percent Ti; and
   subjecting the alloy to one or more of a thermal treatment process and a physical stress application process to form a superelastic alloy that is not capable of shape memory behavior.

13. The method of claim 12, wherein forming an alloy comprises forming the alloy through one or more of one or more of a powder sinter process, a powder metallurgy process, a vacuum melting process, an electron beam melting process, a vacuum arc melting process, a high frequency vacuum melting process, a vacuum induction melting process, and a plasma melting process.

14. The method of claim 12, wherein subjecting the alloy to one or more of a thermal treatment process and a physical stress application process comprises:
   isostatically pressing and hot rolling the alloy to form a pressed, heated alloy; and
   quenching the pressed, heated alloy in oil or gas to form the superelastic alloy.

15. The method of claim 12, wherein subjecting the alloy to one or more of a thermal treatment process and a physical stress application process comprises:
   isostatically pressing and hot rolling the alloy to form a pressed, heated alloy; and
   cooling the heated alloy to form a pressed, cooled alloy; and
   applying one or more of tensile stress and compressive stress to the pressed, cooled alloy to permanently strain the pressed, cooled alloy and form the superelastic alloy.

16. The method of claim 12, further comprising subjecting the superelastic alloy to one or more of a machining process, a grinding process, a cutting process, and a molding process to form a seal structure.

17. A method of forming a superelastic metal seal, comprising:
   forming an Ni—Ti alloy comprising from about 58 weight percent Ni to about 65 weight percent Ni and from about 35 weight percent Ti to about 65 weight percent Ti;
   forming a seal structure from the Ni—Ti alloy; and
   subjecting the seal structure to one or more of a thermal treatment process and a physical stress application process to convert the Ni—Ti alloy thereof into a superelastic Ni—Ti alloy that is not capable of shape memory behavior.

18. The method of claim 17, wherein forming a seal structure from the Ni—Ti alloy comprises processing the Ni—Ti alloy to form an O-ring, a C-ring, a D-seal, a T-seal, a V-seal, an X-seal, a flat seal, a lip seal, a cup seal, a back-up ring, a bonded seal, or a packing element.

19. The method of claim 17, wherein subjecting the seal structure to one or more of a thermal treatment process and a physical stress application process comprises subjecting the Ni—Ti alloy to a strain within a range of about 2% to about 15%.

20. The method of claim 17, wherein subjecting the seal structure to one or more of a thermal treatment process and a physical stress application process imparting the seal structure with a permanent strain of at least about 0.5%.

* * * * *